United States Patent
Tanioka et al.

[11] Patent Number: 6,078,682
[45] Date of Patent: *Jun. 20, 2000

[54] IMAGE PROCESSING APPARATUS AND METHOD, AND IMAGE READING APPARATUS

[75] Inventors: Hiroshi Tanioka; Shinobu Arimoto; Yoshinobu Sato, all of Yokohama; Kazuo Yoshinaga, Machida; Toshio Hayashi, Kawasaki; Takehiko Nakai, Tokyo; Tsutomu Utagawa, Yokohama; Tetsuya Nagase, Kawasaki; Junko Kuramochi; Nobuatsu Sasanuma, both of Yokohama; Yoshiki Uchida, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,276

[22] Filed: Jun. 12, 1996

Related U.S. Application Data

[63] Continuation of application No. 08/172,095, Dec. 23, 1993, abandoned.

[30] Foreign Application Priority Data

Jan. 1, 1993 [JP] Japan ....................................... 5-15095
Jul. 30, 1993 [JP] Japan ...................................... 5-190095

[51] Int. Cl.$^7$ ........................................................ G06K 9/00
[52] U.S. Cl. .......................... 382/135; 355/133; 399/366; 382/165
[58] Field of Search ..................................... 382/135, 205, 382/165; 355/133, 201; 380/3, 55, 54; 399/366

[56] References Cited

U.S. PATENT DOCUMENTS

| 4,586,811 | 5/1986 | Kubo et al. | 355/201 |
| 4,603,970 | 8/1986 | Aota et al. | 355/133 |
| 4,723,149 | 2/1988 | Harada | 355/201 |
| 4,739,377 | 4/1988 | Allen | 355/201 |
| 5,321,470 | 6/1994 | Hasuo et al. | 355/201 |
| 5,367,577 | 11/1994 | Gotaas | 382/135 |
| 5,379,093 | 1/1995 | Hashimoto et al. | 355/201 |

FOREIGN PATENT DOCUMENTS 0342060  12/1989  European Pat. Off. .

*Primary Examiner*—Bhavesh Mehta
*Attorney, Agent, or Firm*—Fitzpatrick, Cella, Harper & Scinto

[57] ABSTRACT

An object of the present invention is to provide an image processing apparatus and an image processing method both offering a high-precision and general-purpose capability of identifying an image and performing appropriate processing depending on whether identification is effected. In the image processing apparatus and image processing method, image data is detected in visible and invisible light reflected from each of a target pixel and surrounding pixels. Based on the image data detected in visible and invisible light, a specific pattern is identified. The specific pattern appears substantially the same in color as a surrounding area under visible light but different in characteristic therefrom under invisible light, which is identified using the image data of the target pixel and surrounding pixels provided by a detector. The image processing apparatus is controlled depending on whether the identification is effected.

24 Claims, 6 Drawing Sheets

IMAGE PROCESSING APPARATUS AND METHOD, AND IMAGE READING APPARATUS

This application is a continuation of application Ser. No. 08/172,095 filed Dec. 23, 1993, now abandoned.

BACKGROUND OF THE INVENTION

1. Field of the Invention

The present invention relates to an image processing apparatus and an image processing method both applicable to a digital copying machine, an image reading scanner, a facsimile machine, or the like.

2. Related Background Art

Heretofore, an image processing apparatus or the like has been known which identifies securities by detecting visible patterns or visible characteristics of images, and thus contributes to prevention of forgery.

The above patterns drawn in securities for prevention of forgery of securities are so visible that it is hard to design an identification pattern usable in common among numerous securities. Therefore, to distinguish N kinds of securities, N types of characteristics must be predetermined for the respective securities. The securities are therefore able to be identified independently. However, it is hard to realize an image processing apparatus for making the identification at a low cost.

SUMMARY OF THE INVENTION

Accordingly, an object of the present invention is to provide an image processing apparatus and an image processing method both offering a high-precision and general-purpose image identification capability.

Another object of the present invention is to provide an image processing apparatus and an image processing method, both of which are based on a method of effectively detecting interference with image identification.

Another object of the present invention is to provide a reading apparatus for successfully detecting a portion of an original having a specific color and possessing an infrared absorption characteristic.

To accomplish the above objects, a preferred embodiment of the present invention provides an image processing apparatus for identifying a specific pattern using image data in visible and invisible light comprising:

a detecting means for detecting image data in visible and invisible light reflected from each of a pixel of interest and surrounding pixels;

an identifying means for identifying a specific pattern, which appears the same in color as a surrounding area under visible light but different in absorption characteristic under invisible light, using the image data of the pixel of interest and surrounding pixels provided by the detecting means; and a control means for controlling the image processing apparatus depending on identification is effected.

Yet another object of the present invention is to provide an image processing apparatus and an image processing method both offering a novel capability.

Other objects and features of the present invention will be apparent from the appended description and drawings.

DETAILED DESCRIPTION OF THE PREFERRED EMBODIMENTS

The present invention will be described in conjunction with preferred embodiments.

In the preferred embodiments described below, a copying apparatus is used as an example of an application of the present invention. The application range thereof is not limited to the copying apparatus but may extend to other various apparatuses including a facsimile apparatus.

[First Embodiment]

Figure 1:
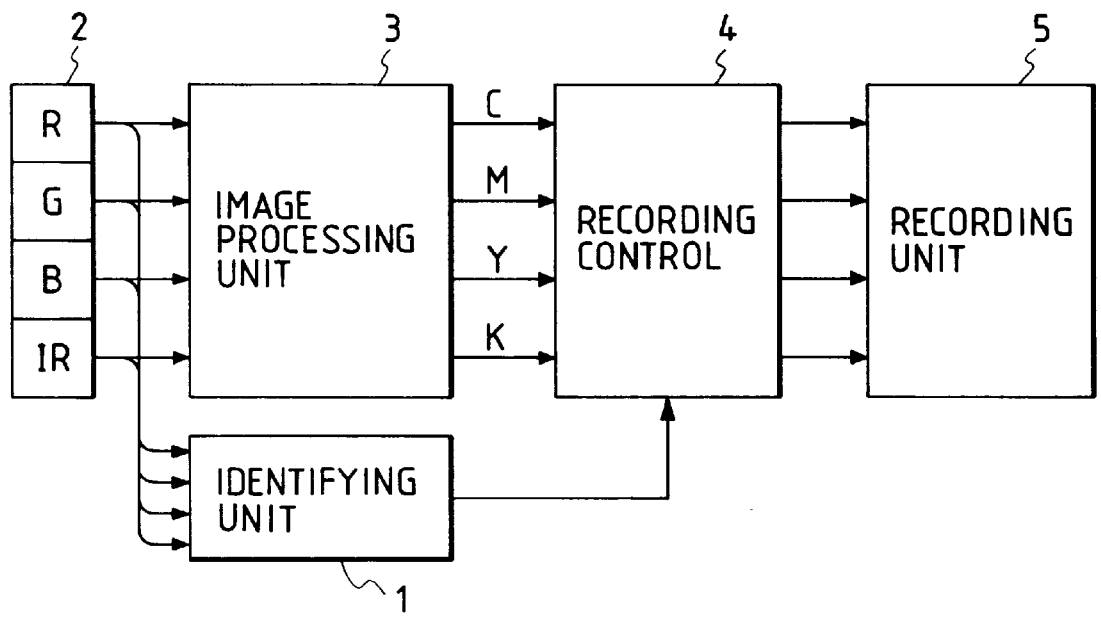
FIG. 1 is a block diagram showing an overall configuration of an image processing apparatus in the first embodiment of the present invention.

FIG. 1 is a block diagram of an embodiment of the present invention.

An image reading sensor 2 represented by a charge coupled device (CCD) decomposes a single point in an original into light having color components of red (R), green (G), and blue (B) as well as an infrared component sensitive to wavelengths of about 1000 nm, and reads image data from the light at a pixel density of 400 dpi.

The outputs of the image reading sensor 2 are passed through a white plate or an infrared reference plate to undergo so-called shading correction, and then supplied as 8-bit image signals to an identifying unit 1 and an image processing unit 3. The image processing unit 3 performs magnification variation, masking, UCR, and other processing similarly to a general color copying machine, and produces recording signals that are four color signals of cyan (C), magenta (M), yellow (Y), and black (K).

The identifying unit 1 detects a specific pattern in an original, outputs the result of the detection to a recording control unit 4, and modifies the recording signals to, for example, paint the corresponding point in the original in a specific color. A recorder 5 then records the processed signal data on recording paper or stops recording. Thus, faithful image reproduction is disabled.

Figure 2:
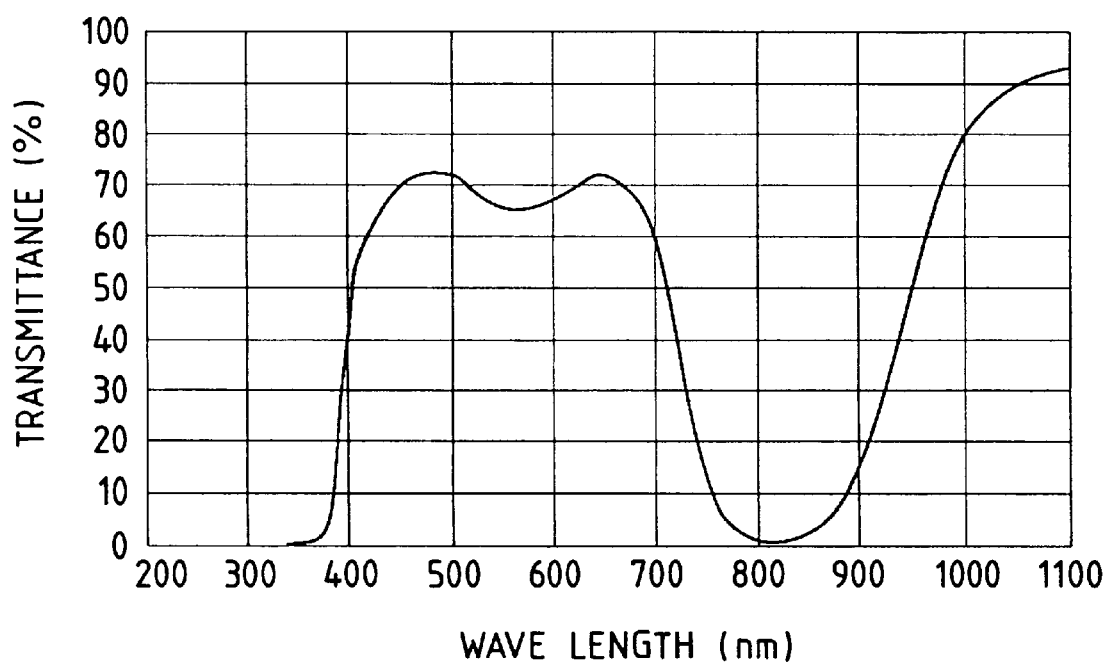
FIG. 2 shows a characteristic of a material absorbing infrared light.
Figure 3A:
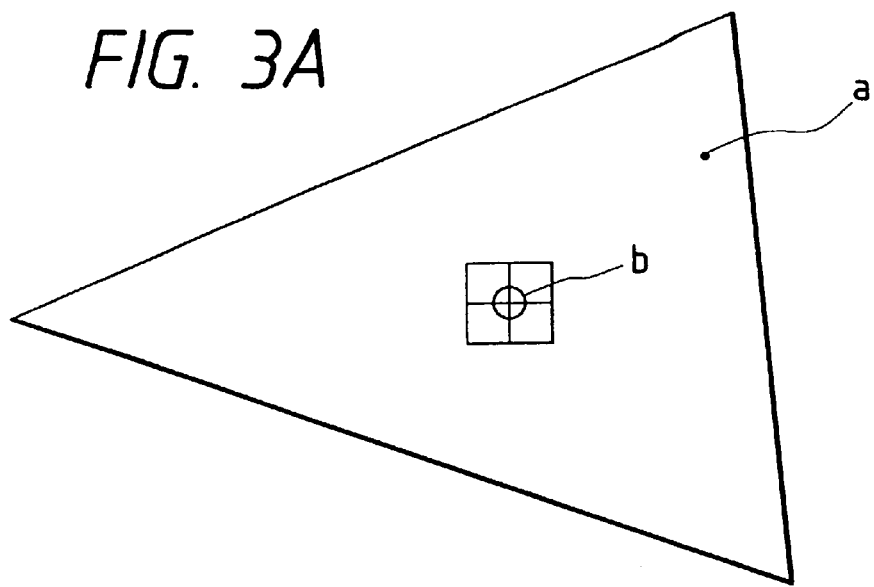
FIGS. 3A to 3D show examples of pattern formation according to the present invention.
Figure 3B:
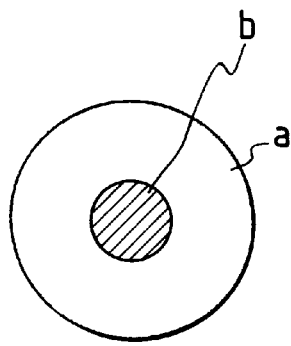
Figure 3C:
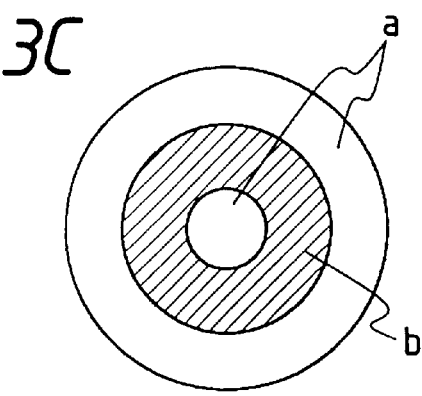
Figure 3D:
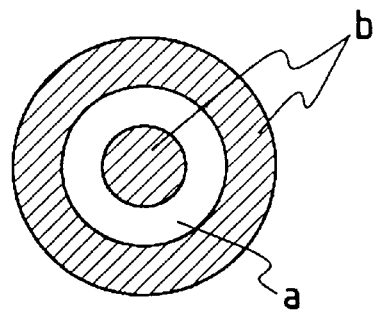

Next, an image pattern that the present invention attempts to detect will be briefed in conjunction with FIGS. 2 to 3D.

FIG. 2 shows a spectral characteristic of a transparent coloring matter that transmits visible light and absorbs infrared light having wavelengths of about 800 nm. A typical transparent coloring matter is SIR-159 manufactured by Mitsui Toatsu Liquid Carbonic Co., Ltd.

FIG. 3A shows an example of a pattern produced using a transparent ink made of the above transparent infrared absorptive coloring matter. Specifically, a microscopic square pattern b, each side of which sides is about 120 micrometers long, is printed within a triangular pattern, which is recorded in an ink a that reflects specific light or infrared light, using the above transparent ink characteristic of absorbing infrared light. The square pattern b applied the transparent ink appears, as shown in FIG. 2, in substantially the same in color as a surrounding area under visible light. The microscopic pattern b is therefore indiscernible to human eyes. As for infrared light, the ink a is characteristic of reflection while the transparent ink b is characteristic of absorption. The microscopic pattern b is therefore detectable under infrared light. For the succeeding description, a square pattern, each of which sides is about 120 micrometers long, is illustrated as an example. Assuming that the area b is read at 400 dpi, the area b is represented with about four pixels. The pattern formation method is not limited to this example. As long as the area b can be identified by 400-dpi scanning, a circular pattern shown in FIGS. 3B to 3D and not oriented in any particular direction may be employed.

Figure 4:
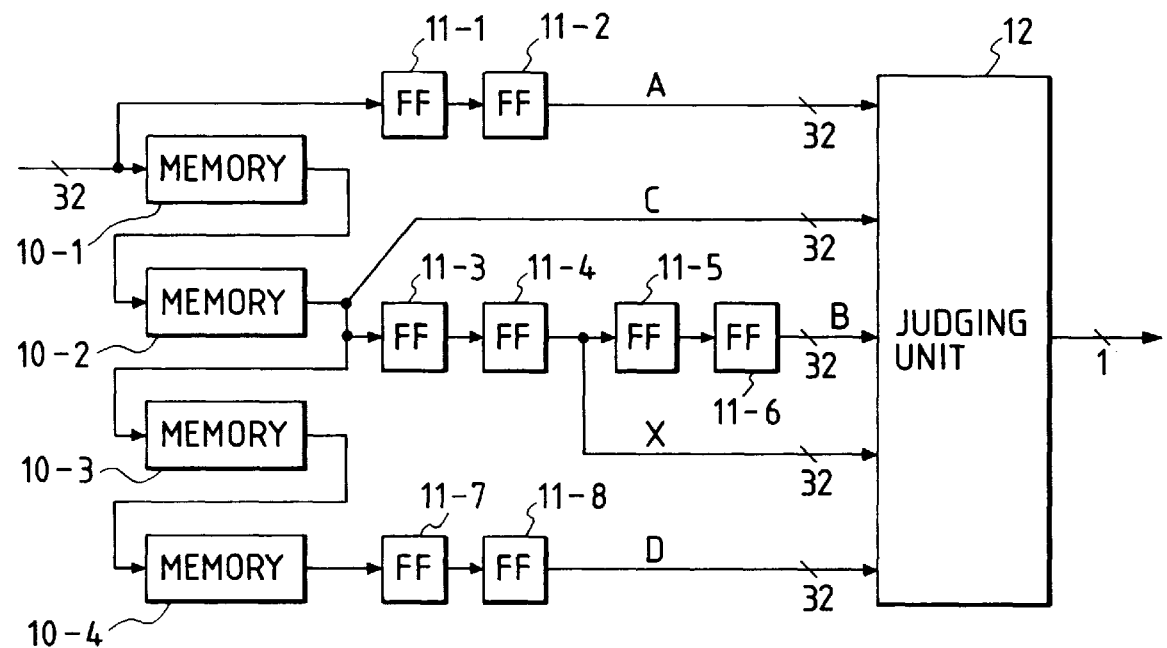
FIG. 4 shows a configuration of an identifying unit 1.

Using FIG. 4, the identifying unit 1 shown in FIG. 1 will be described in detail. Reference numeral 10 in FIG. 4 denotes image data delay units that are FIFO buffers. Each of the image data delay units 10 holds 32-bit (8 bits by 4 components) image data for a time interval corresponding to one line.

Figure 5:
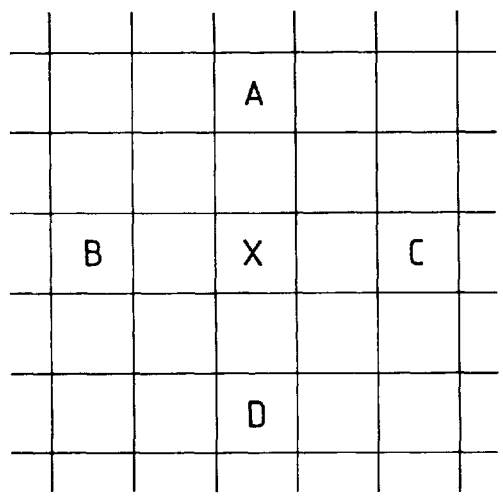
FIG. 5 shows locations of reference pixels in a determining unit (judging unit) 12.

An input image signal is delayed or held for a time interval corresponding to two pixels by flip-flops 11-1 and 11-2. Resultant image data A is delayed or held for a time interval corresponding to two lines by means of memories 10-1 and 10-2. Resultant image data C is delayed or held for a time interval corresponding to two pixels by flip-flops 11-3 and 11-4. Resultant pixel-of-interest data X is delayed for a time interval corresponding to two pixels by flip-flops 11-5 and 11-6. Resultant image data B is delayed or held similarly, whereby image data D is produced. These image data A to D are fed to a determining unit (judging unit) 12. FIG. 5 shows the positional relationships of the pixels A to D to the pixel of interest X.

Assuming that the pixel of interest X represents the portion b shown in FIGS. 3A to 3D, the above pixels A, B, C, and D represent the pattern a surrounding the portion b. In this embodiment, a determination pattern or a specific pattern is detected in a combination of the pixel of interest X and surrounding four pixels A, B, C, and D. Even when the pattern is modified, if the positions of the pixels are modified in association with the modified pattern, the pixel applied using the ink b should be read as a pixel of interest (target pixel) and the pixels applied using the ink a should be read as surrounding pixels. If a circuitry permitting this reading is available, an algorithm presented below can be employed as a pattern determination algorithm.

The pattern determination algorithm will be described below.

(Determination algorithm 1)

Assume that a red (R) component of a pixel signal A is $A_R$, a green (G) component thereof is $A_G$, a blue (B) component thereof is $A_B$, and an infrared component thereof is $A_{IR}$. The R, G, B, and IR components of each of pixel signals B, C, and D are defined in a similar manner. Average voltage values of color components of the pixel signals A, B, C, and D: that is, $Y_R$, $Y_G$, $Y_B$, and $Y_{IR}$ are provided as follows:

$Y_R = \frac{1}{4}(A_R+B_R+C_R+D_R)$ $Y_G = \frac{1}{4}(A_G+B_G+C_G+D_G)$ $Y_B = \frac{1}{4}(A_B+B_B+C_B+D_B)$ $Y_{IR} = \frac{1}{4}(A_{IR}+B_{IR}+C_{IR}+D_{IR})$ Pattern determination in this embodiment is achieved by checking a difference of a voltage value of a pixel-of-interest signal from the average voltage values Y calculated accor, ding to the above expressions. Assuming that:

$\Delta R = |Y_R - X_R|$, $\Delta G = |Y_G - X_G|$, $\Delta B = |Y_B - X_B|$, $\Delta IR = Y_{IR} - X_{IR}$ when the following conditions are met:

$\Delta R < K$, $\Delta G < K$, $\Delta B < K$, $\Delta IR > L$ (L is a constant, and K is a constant approximate to zero.), it is determined in this embodiment that a determination pattern is identified.

According to this algorithm, if even one pixel satisfies these determination conditions, it is determined that a determination pattern is identified. For precautions against incorrect determination, only when a predetermined number of pixels or more satisfy the conditions, it may be determined that a determination pattern is identified.

In other words, when a difference in color tone of a pixel of interest from surrounding pixels under visible light is too small to discern, if the infrared absorbance of the pixel of interest differs by a constant L or more from those of the surrounding pixels, the pixel of interest is recognized as a determination pattern.

Figure 6:
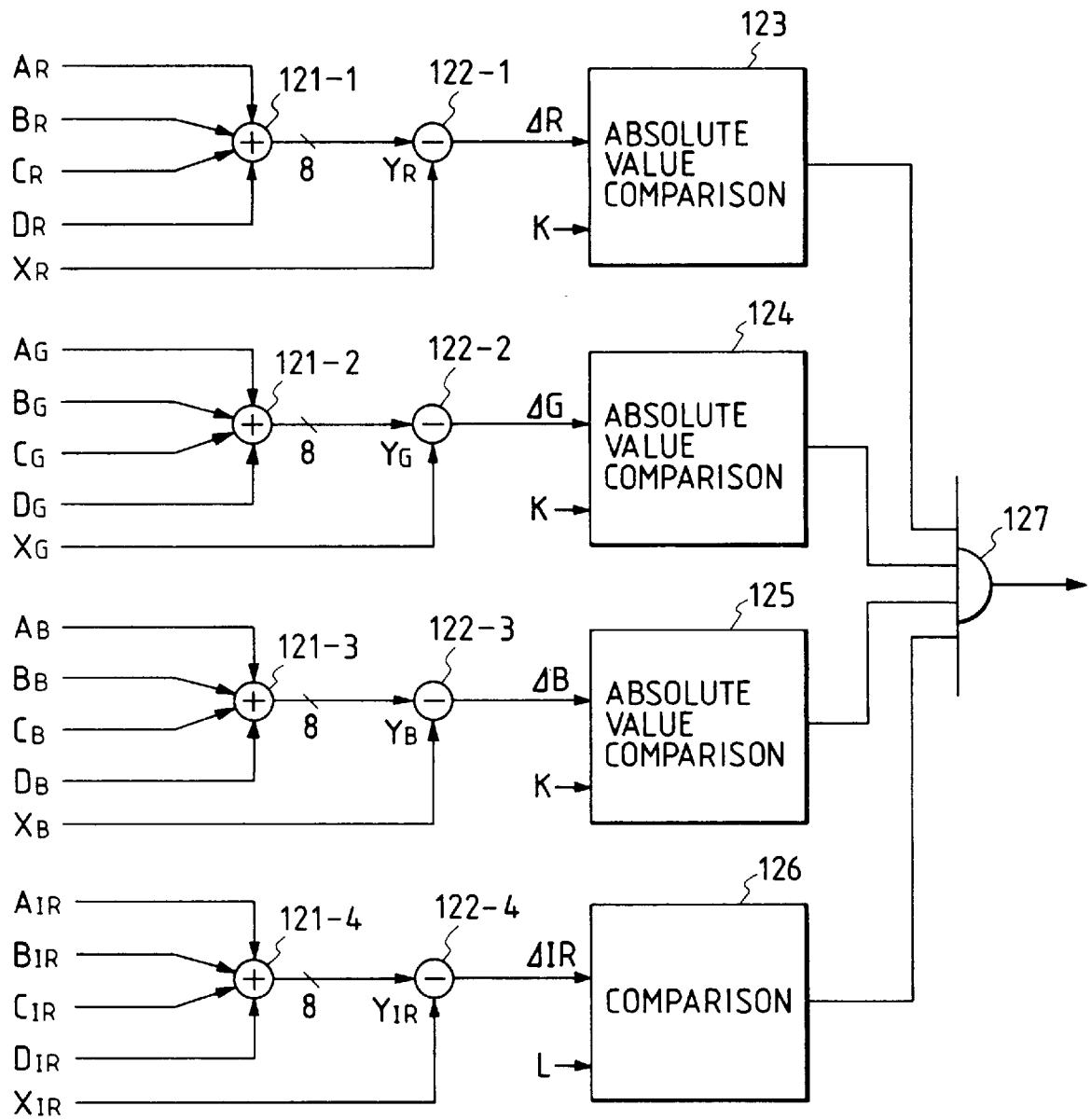
FIG. 6 shows a configuration of the determining unit 12.

FIG. 6 shows an example of hardware required to implement the foregoing determination algorithm. Each of adders 121 simply add up voltage values of color components of four pixel signals and outputs the eight high-order bits of the sum. This results in signals $Y_R$, $Y_G$, $Y_B$, and $Y_{IR}$. Subtracters 122 calculate differences $\Delta R$, $\Delta G$, $\Delta B$, and $\Delta IR$ between the voltage values of the $Y_R$, $Y_G$, $Y_B$, and $Y_{IR}$ signals and those of the components of the pixel-of-interest signal; that is, $X_R$, $X_G$, $X_C$, and $X_{IR}$. Among the calculated differences, the absolute values of $\Delta R$, $\Delta G$, and $\Delta B$ are compared with a constant K by comparators 123, 124, and 125. The data of the eight high-order bits of the sum of the voltage values of infrared components is compared with a constant L by a comparator 126. The outputs of the comparators are fed to an AND gate 127. When the output terminal of the AND gate 127 provides "1"; that is, the aforesaid determination conditions are met in all the color components and the infrared component of the pixels concerned, it is determined that a specific pattern is identified.

[Second Embodiment]

In practice, when determination is carried out, a stain may be present in a specific pattern in a printed matter or in an area near the specific pattern. In this case, the inks used for a stain area and an area surrounding the stain area may deteriorate by a certain ratio in terms of the characteristic of reflecting infrared light. Depending on the components of the stain, a ratio of the reflectance relative to infrared light of the ink used in the stain area to that of the ink used in the surrounding area, which is a quotient of $Y_{IR}$ by $X_{IR}$ is held unchanged but the reflectances thereof deteriorate. When consideration is taken into this event, the following determination conditions should be adopted:

$\Delta R < K$, $\Delta G < K$, $\Delta B < K$, $\Delta IR > L1$ or $Y_{IR}/X_{IR} > L2$ (L1 and L2 are constants.)

The adoption of these determination conditions will improve determination precision.

Figure 7:
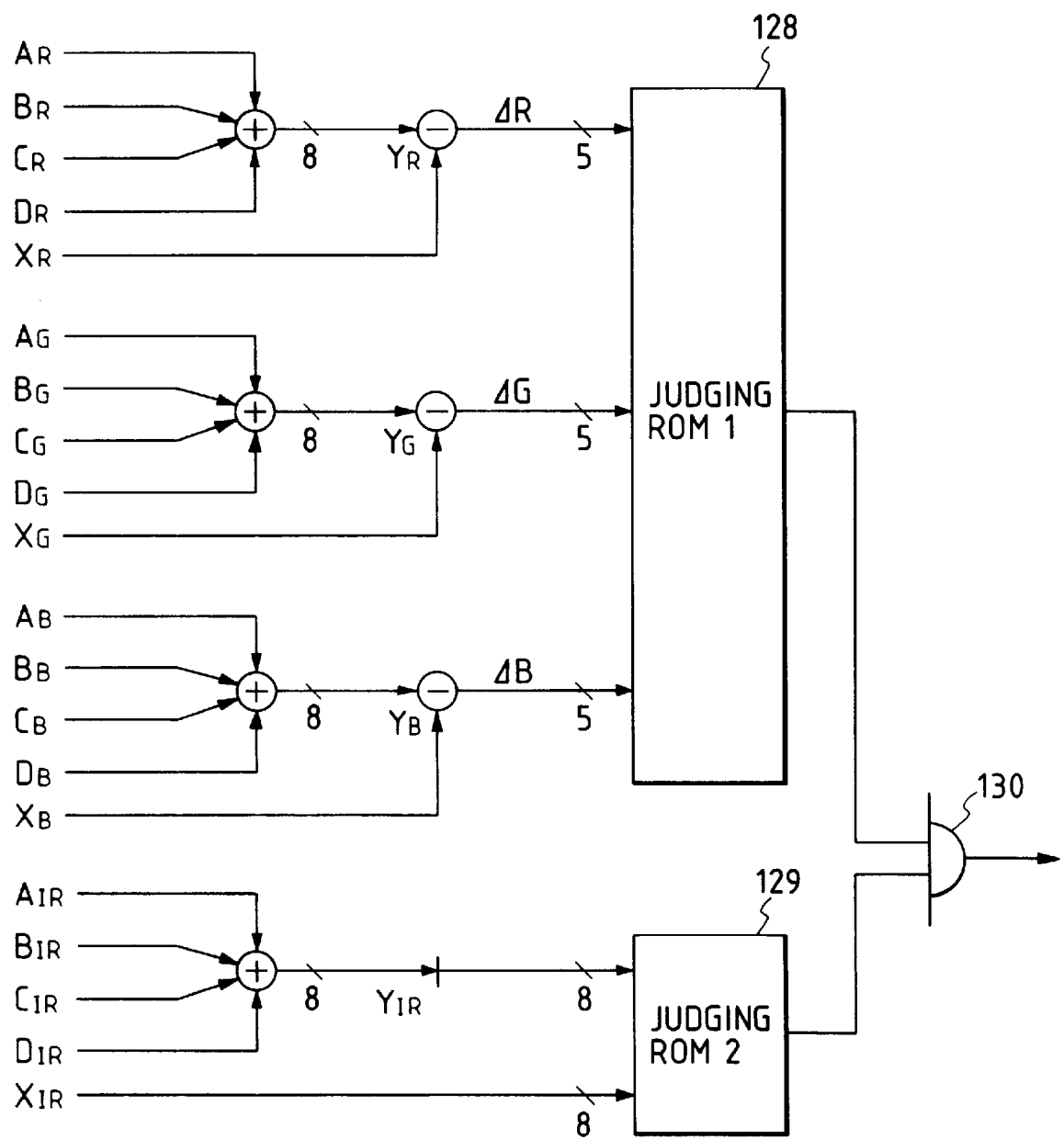
FIG. 7 shows another configuration of the determining unit 12.

FIG. 7 shows a variant of the circuitry shown in FIG. 6. A ROM 1 is used to check visible light and a ROM 2 is used to check infrared spectrum. Each of the $\Delta R$, $\Delta G$, and $\Delta B$ values consists of 5 bits which are smaller in number than the above 8 bits. Each of the 32-bit ROMs contains a look-up table listing results of determination. As for infrared light, the 8-bit data $Y_{IR}$ and $X_{IR}$ are fed to an address terminal of a determination ROM 129. Thus, determination can be achieved. The ROMs may be replaced with RAMS, which brings about the same advantages.

[Third Embodiment]

Even when an attempt is made to detect the aforesaid pattern in an original, if a substantially transparent material that absorbs infrared light is interposed between the original and a sensor, it becomes impossible to detect a difference in infrared absorbance between the patterns a and b. As measures against this event, the following conditions are added to the aforesaid algorithm:

$IR_{IR}<L3$ min $(X_R, X_G, X_B)>M$ min $(Y_R, Y_G, Y_B)>M$

When all the conditions are met, it is determined that a specific pattern is identified. In general, a white portion of, for example, recording paper reflects infrared light. However, when a material absorbing infrared light is interposed between an original and a sensor, even a substantially white area of ordinary recording paper is prevented from reflecting infrared light. When both the X and Y image signals represent substantially white under visible light, if the $X_{IR}$ value is small; that is, if the infrared light reflected by a pixel of interest is small in ratio, pattern detection is obviously interfered. It is then determined that a material absorbing infrared light is inserted in any form. If "pattern identified" is determined even in this event, an action of interference with pattern detection can be prevented effectively. For higher precision, only when a predetermined number of pixels or more satisfy the above determination conditions, it may be determined that an interferential action is identified.

[Fourth Embodiment]

When carbon black or other coloring material is adhered on a specific original or printed on the back face of the original, the overall reflectance of the original deteriorates. However, the reflectance of the portion of the original not applied infrared absorptive elements of red (R), green (G), and blue (B) deteriorates minutely differently from the portion thereof bearing the elements. It becomes very hard to specify a threshold for determination based on an output difference or ratio. Incorrect determination is likely to occur. Accordingly, this embodiment distinguishes the portion of an original, in which carbon black or the like is adhered or printed, on the basis of the fact that when carbon black or the like is adhered or printed, the voltage values of red, green, and blue components of a signal acquired from the portion of the original deteriorate without exception. Inks a and b appear almost the same in color under visible light. When the inks a and b are decomposed into three colors of red, green, and blue, as shown in Table 1, the red component of the ink b shows a higher reflectance than that of the ink a. For comparison, when carbon black is adhered or printed in a back face, the red component of the ink b shows a lower reflectance than that of the ink a. When these kinds of ink materials; that is, those having the characteristics of the inks a and b are employed, determination can be achieved by comparing the visible components of the ink b applied to a pixel of interest with those of the ink a applied to areas surrounding the pixel of interest in terms of reflectance. Thus, the determination is conditioned on neither what is a difference in reflectance between the inks nor what is a ratio of the reflectance of one ink to that of the other ink, but whether the reflectance of one ink is higher or smaller than that of the other ink.

TABLE 1

|  | Ink a | Ink b |
| --- | --- | --- |
| Component R | 50 | 70 |
| Component G | 113 | 110 |
| Component B | 75 | 73 |
| Infrared Component | 200 | 100 (255 upon 100% reflection) |

In other words, the reflectance of at least one of the color components of red, green, and blue of an infrared absorptive ink applied to a pixel of interest is made higher than that of an ink applied to pixels surrounding the pixel of interest. Thus, even when carbon black or other coloring material is adhered or printed on the back face of an original, it is determined whether the reflectances of the visible components of red, green, and blue of a pixel of interest are higher or lower than those of surrounding pixels. Thus, incorrect determination concerning pattern detection can be prevented.

Specifically, when a pixel of interest differs minutely in color tone from pixels surrounding the pixel of interest under visible light, if at least one color component of the pixel of interest is higher in reflectance than those of the surrounding pixels, and if the infrared absorbance of the pixel of interest differs by a constant L or more from that of the surrounding pixels, the pixel of interest is identified as a specific pixel.

Pattern detection in this embodiment is based on a difference of the voltage value X of a pixel-of-interest signal from average voltage values Y calculated in the embodiment 1. Assuming that:

$\Delta R = Y_R - X_R$, $\Delta G = Y_G - X_G$, $\Delta B = Y_B - X_B$, and $\Delta IR = Y_{IR} - X_{IR}$ when the following conditions are satisfied:

$|\Delta R| < K$, $|\Delta G| < K$, and $|\Delta B| < K$ $\Delta IR > L$ (K and L are constants.), and $\Delta G < 0$, $\Delta R < 0$, or $\Delta B < 0$, it is determined that a determination pattern is identifies.

Figure 8:
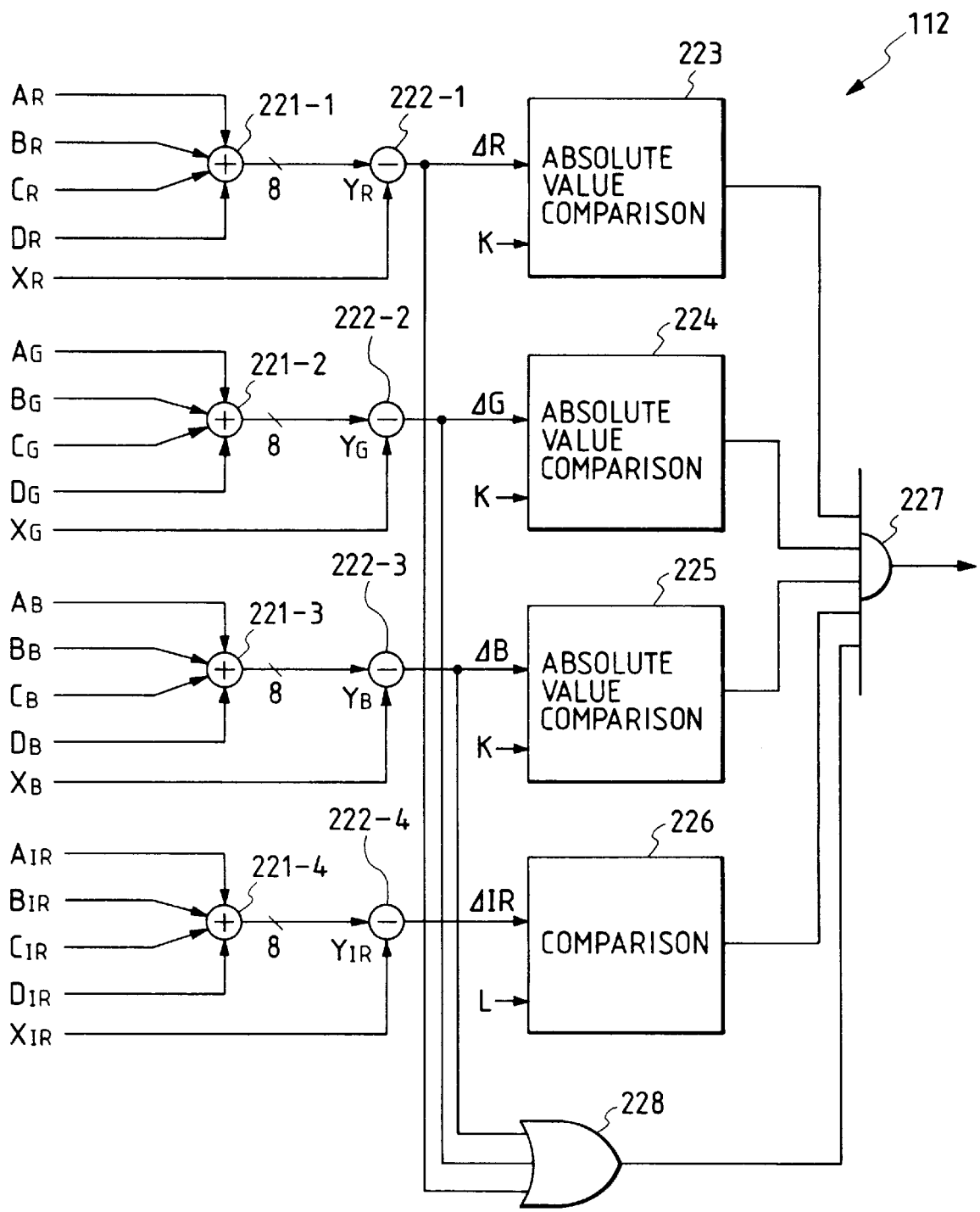
FIG. 8 shows a configuration of the determining unit 112 in the fourth embodiment of the present invention.

FIG. 8 shows an example of a determining unit 112 in which the determination algorithm of the fourth embodiment is implemented. Each of adders 221 simply adds up voltage values of color components of four pixel signals and outputs the eight high-order bits of the sum. This results in signals $Y_R, Y_G, Y_B$, and $Y_{IR}$. Subtracters calculate differences of the voltage values of these signals from those of the color components of a pixel-of-interest signal. The absolute values of the differences between the voltage values of red, green, and blue components are compared with a constant K by comparators 223, 224, and 225. The sign bits in the outputs of the subtracters 222-1, 222-2, and 222-3 are fed to an OR circuit 228. When the sign bit of at least one of three color component signals represents a minus, the output of the OR gate 228 becomes "1". The output is then fed to an AND gate 227. Voltage values of infrared components of the pixel signals are compared with a constant L by a comparator 226. The outputs of the comparators are then fed to the AND gate 227. When "1" is provided through the output terminal of the AND gate 227, a determination pattern is identified.

Similarly to the embodiment 2, the reflectances of an ink applied to a specific patter or determination pattern in a printed matter and of an ink applied to a surrounding area therein may deteriorate by only a certain value due to a stain. The constant L must therefore be specified in consideration of this event. Depending on the components of the stain, although the ratio of the reflectance relative to infrared light of one ink to that of the other ink, which is provided as a quotient of $Y_{IR}$ by $X_{IR}$, is held unchanged, the reflectances of the inks deteriorate. The determination conditions should therefore be defined as follows:

|ΔR|<K,

|ΔG|<K, and

|ΔB|<K,

ΔG<0, ΔR<0, or ΔB<0, and

ΔIR>L1, or $Y_{IR}/X_{IR}$>L2

(L1 and L2 are constants.)

When determination is performed under these conditions, improved determination precision ensues.

[Another Embodiment]

(1) Color Signal

In the aforesaid embodiments, a signal representing visible light is decomposed into red, green, and blue components. As long as it is recognized that a pixel of interest X has no difference in visible color tone from surrounding pixels, the signal representing reflected light may be converted into coordinates in other color space; such as, (L, a*, b*) or (Y, I, Q), and then subjected to the processing described above. This variant also provides the same advantages.

(2) Surrounding Reference Area

In the aforesaid embodiments, four pixels including a pixel of interest and surrounding pixels are employed. The number of pixels may be 8 consisting of the four pixels and another four diagonal pixels. Alternatively, the number of pixels may be 16 to enclose the pixel of interest in a rectangle. This enables detection of a color tone Y of a surrounding area with higher precision. In the embodiments, voltage values of color components of surrounding pixel signals are averaged to detect the color tone of a surrounding area, To determine precisely that the surrounding area has not undergone line mesh-point printing, variances of the voltage values of the color component signals from an average value must be taken into consideration. For easy description, a microscopic pattern is defined to consist of four pixels. When the number of pixels is 9, surrounding pixels must be located in a wider area, The positions of surrounding pixels to be referenced should be determined according to the size of a pattern.

(3) Result of Determination

In the description of the aforesaid embodiments, a pixel of interest alone is checked to make determination. When a pattern to be identified as a result of determination; that is, a determination pattern (microscopic pattern of b) is composed of four pixels, if the four pixels are checked for the determination pattern, final determination is made on four successive results of determination on the four pixels to thereby permit more precise identification.

If many patterns are present scatteringly, the number of patterns in a unit area is counted, final determination is made on the basis of the results of determination concerning whether or not a predetermined number of patterns are identified. This leads to more precise identification.

The pattern may be made by printing a transparent infrared ink in a base of an original that is an unprinted area.

(4) Preprocessing

In order to detect a difference in infrared absorbance between patterns a and b in more stable manner, edge emphasis based on Laplacian filtering may be performed to enhance an infrared spectrum prior to determination. Surrounding pixels to be referenced in this case are pixels A, B, C, and D in FIG. 5, whereby the hardware in the aforesaid embodiments can be used in common for this variant. This variant can therefore be realized at a low cost.

Determination according to the present invention is based on image information acquired from visible light and infrared light. Needless to say, a specific image may be identified by checking in combination the reflectances or absorbances relative to visible light and invisible light except infrared light As described so far, the determination pattern mentioned in the embodiments can be identified irrelevant of the orientation of an original. Since the determination pattern permits high-precision identification and cannot be discerned by human eyes, it can be used for any kind of image.

The application range of the present invention is not limited to the aforesaid embodiments. It will be apparent that, various applications and variants of the present invention are available without departing from the scope defined with the appended claims.

What is claimed is:

1. An image processing apparatus for identifying a specific pattern on the basis of image data acquired from visible and invisible light, comprising:

detecting means for detecting image data from both visible and invisible light reflected from each of a pixel of interest and a plurality of surrounding pixels;

identifying means for identifying a specific pattern, which appears substantially the same in color as a surrounding area under visible light but different in characteristic therefrom under invisible light, on the basis of the image data provided by said detecting means for the pixel of interest and the plurality of surrounding pixels from both the visible and the invisible light;

converting means for converting the image data from the visible light to image data for use in image formation; and control means for controlling said image processing apparatus to form an image using the converted image data in accordance with whether or not said identifying means effects identification.

2. An image processing apparatus according to claim 1, wherein said specific pattern is a circle.

3. An image processing apparatus according to claim 1, wherein said identifying means handles decomposed visible light for each color component.

4. An image processing apparatus according to claim 1, wherein said control means stops normal operation of said image processing apparatus.

5. An image processing apparatus according to claim 1, wherein the distances of said pixel of interest from said surrounding pixels are predetermined according to the size of said specific pattern.

6. An image processing apparatus for identifying a specific pattern on the basis of image data acquired from visible and invisible light, comprising:

detecting means for detecting image data from both visible and invisible light reflected from each of a pixel of interest and a plurality of surrounding pixels;

recognizing means for recognizing the presence of a specific pattern, on the basis of the image data provided by said detecting means for the pixel of interest and the plurality of surrounding pixels from both the visible light and the invisible light, when the image data detected by said detecting means indicate that the pixel of interest has a higher reflectance relative to at least one color component of the visible light than the surrounding pixels, and a higher absorbance relative to the invisible light than the surrounding pixels;

converting means for converting the image data from the visible light to image data for use in image formation; and control means for controlling said image processing apparatus to form an image using the converted image data in accordance with whether or not said recognizing means effects recognition.

7. An image processing apparatus according to claim 6, wherein said specific pattern is a circle.

8. An image processing apparatus according to claim 6, wherein said control means stops normal operation of said image processing apparatus.

9. An image processing apparatus for identifying a specific image by distinguishing a specific pattern that appears the same in color as a surrounding area under visible light but different in characteristic therefrom under invisible light, comprising:

detecting means for detecting image data from both visible and invisible light reflected from each of a pixel of interest and a plurality of surrounding pixels;

first determining means for decomposing the image data detected from the visible light reflected from the pixel of interest and the plurality of surrounding pixels into color components, comparing the color component data between the pixel of interest and the plurality of surrounding pixels, and determining that the pixel of interest appears the same in color as the plurality of surrounding pixels;

second determining means for determining that the image data detected from the invisible light reflected from the pixel of interest and the plurality of surrounding pixels have a difference in magnitude therebetween greater than or equal to a predetermined value;

converting means for converting the image data from the visible light to image data for use in image formation; and distinguishing means for identifying the specific image by distinguishing the specific pattern using said first and second determining means, wherein image formation using the converted image data is controlled in accordance with an identification result by said distinguishing means.

10. An image processing apparatus for identifying an interfering action during detection of an absorption characteristic in an image which exhibits a spectral characteristic relative to infrared light, comprising:

reading means for reading image data from both visible and infrared light reflected from each of the first and second positions of the image; and detecting means for detecting that image data read from the visible light by said reading means at the first and second positions have high values while the image data read from the infrared light at the first position indicate an infrared absorption characteristic; and identifying means for identifying the presence or absence of the interfering action on detecting said absorption characteristic from an image having the absorption characteristic relative to the infrared light in accordance with a result of the detection.

11. An image processing apparatus according to claim 10, further comprising control means for controlling said image processing apparatus according to the output of said detecting means.

12. An image processing apparatus according to claim 11, wherein said control means stops said image processing apparatus.

13. An image processing method for identifying a specific pattern on the basis of image data acquired from visible and invisible light, comprising the steps of:

detecting image data from both visible and invisible light reflected from each of a pixel of interest and a plurality of surrounding pixels;

identifying a specific pattern, which appears the same in color as a surrounding area under visible light but different in characteristic therefrom under invisible light, on the basis of the detected image data for the pixel of interest and the plurality of surrounding pixels from both the visible and the invisible light;

converting the image data from the visible light to image data for use in image formation; and controlling the image processing apparatus to form an image using the converted image data in accordance with whether or not said identifying step effects identification.

14. An image processing method according to claim 13, wherein said specific pattern is a circle.

15. An image processing method according to claim 13, wherein at said identifying step, decomposed visible light is handled for each color component.

16. An image processing method according to claim 13, wherein at said controlling step, normal operation of an image processing apparatus is stopped.

17. An image processing method according to claim 13, the distances of said pixel of interest from said surrounding pixels are predetermined according to the size of said specific pattern.

18. An image processing method for identifying a specific pattern using image data acquired from visible and invisible light, comprising the steps of:

detecting image data from both visible and invisible light reflected from each of a pixel of interest and a plurality of surrounding pixels;

recognizing the presence of the specific pattern on the basis of the detected image data for the pixel of interest and the plurality of surrounding pixels from both the visible and the invisible light, when the image data detected at said detecting step indicate that the pixel of interest has a higher reflectance relative to at least one color component of the visible light than the surrounding pixels, and a higher absorbance relative to the invisible light than the surrounding pixels;

converting the image data from the visible light to image data for use in image formation; and controlling an image processing apparatus to form an image using the converted image data in accordance with whether or not said recognizing step effects recognition.

19. An image processing method according to claim 18, wherein said specific pattern is a circle.

20. An image processing method according to claim 18, wherein at said controlling step, normal operation of said image processing apparatus is stopped.

21. An image processing method for identifying a specific image by distinguishing a specific pattern that appears the same in color as a surrounding area but different in characteristic therefrom under invisible light, comprising the steps of:

detecting image data from both visible and invisible light reflected from each of a pixel of interest and a plurality of surrounding pixels;

decomposing the image data detected from the visible light reflected from the pixel of interest and the plurality of surrounding pixels into color components, comparing the color component data between the pixel of interest and the plurality of surrounding pixels, and determining that the pixel of interest appears the same in color as the plurality of surrounding pixels;

determining that the image data detected from the invisible light reflected from the pixel of interest and the plurality of surrounding pixels have a difference in magnitude therebetween equal to or greater than a predetermined value;

converting the image data from the visible light to image data for use in image formation; and identifying the specific image by distinguishing the specific pattern through said decomposing step and said determining step, wherein image formation using the converted image data is controlled in accordance with a result of the distinguishing in said identifying step.

22. An image processing method for identifying an interfering action during detection of an absorption characteristic in an image which exhibits a spectral characteristic relative to infrared light, comprising the steps of:

reading image data from both visible and infrared light reflected from each of first and second positions of the image;

detecting that the image data read from the visible light at the first and second positions in said reading step have high values and that the image data read from the infrared light indicate an infrared absorption characteristic; and identifying the presence or absence of the interfering action on detetcting the absorption characteristic from an image having the absorption characteristic relative to the infrared light in accordance with the result of said detecting in said detecting step.

23. An image processing method according to claim 22, further comprising a step of controlling an image processing apparatus according to the output of said detecting step.

24. An image processing method according to claim 23, wherein at said control step, said image processing is stopped.

* * * * *

UNITED STATES PATENT AND TRADEMARK OFFICE
CERTIFICATE OF CORRECTION

PATENT NO. : 6,078,682

DATED : June 20, 2000

INVENTOR(S): HIROSHI TANIOKA, ET AL.

It is certified that error appears in the above-identified patent and that said Letters Patent is hereby corrected as shown below:

COLUMN 3

Line 62, "accor," should read --according--.
    Line 63, "ding" should be deleted.

COLUMN 4

Line 45, "$X_{IR}$" should read --$X_{IR}$,--.
    Line 63, "RAMS" should read --RAMs--.

COLUMN 6

Line 43, "identifies." should read --identified.--.

COLUMN 7

Line 40, "area," should read --area.--.
    Line 46, "area," should read --area.--.

UNITED STATES PATENT AND TRADEMARK OFFICE
CERTIFICATE OF CORRECTION

PATENT NO. : 6,078,682

DATED : June 20, 2000

INVENTOR(S): HIROSHI TANIOKA, ET AL.

It is certified that error appears in the above-identified patent and that said Letters Patent is hereby corrected as shown below:

COLUMN 10

Line 30, "the" should read --wherein the--.

Signed and Sealed this

Seventeenth Day of April, 2001

Attest:

NICHOLAS P. GODICI

Attesting Officer  Acting Director of the United States Patent and Trademark Office